United States Patent [19]

Mensch

[11] Patent Number: 5,075,985
[45] Date of Patent: Dec. 31, 1991

[54] OFFAL SCRAPER

[76] Inventor: Donald L. Mensch, 2721 Bauer Rd., Jenison, Mich. 49428

[21] Appl. No.: 563,298

[22] Filed: Aug. 6, 1990

[51] Int. Cl.⁵ .............................................. E02F 3/76
[52] U.S. Cl. ..................................... 37/117.5; 37/233; 15/245; 172/684.5
[58] Field of Search ............ 172/189, 200, 612, 684.5, 172/747; 37/117.5, 233; 15/245; 119/28

[56] References Cited

U.S. PATENT DOCUMENTS

| | | | |
|---|---|---|---|
| 1,720,630 | 7/1929 | Eiermann | 15/245 |
| 1,789,636 | 1/1931 | Oberti | 15/245 |
| 2,061,585 | 11/1936 | Meyer | 172/612 |
| 2,193,571 | 3/1940 | Siemund | 15/245 |
| 2,347,963 | 5/1944 | O'Neill | 15/245 |
| 2,986,826 | 6/1958 | Timmons . | |
| 3,469,330 | 8/1967 | Hood . | |
| 3,477,149 | 11/1969 | Wagner . | |
| 3,665,622 | 5/1972 | Lamb | 37/117.5 |
| 3,666,020 | 5/1972 | Hess | 172/684.5 X |
| 4,043,060 | 8/1973 | Stepe | 37/117.5 X |
| 4,103,383 | 8/1978 | Martin | 37/265 X |
| 4,189,854 | 2/1980 | Haynes | 37/117.5 |
| 4,200,423 | 4/1980 | Sornsin | 37/117.5 X |
| 4,255,884 | 3/1981 | Williams | 37/117.5 |
| 4,417,628 | 11/1983 | Gessner | 37/117.5 X |
| 4,420,189 | 12/1983 | von Ruden | 37/117.5 X |
| 4,583,307 | 4/1986 | Lenert | 37/233 |
| 4,597,205 | 7/1986 | Guest | 37/241 |
| 4,819,349 | 4/1989 | Mensch | 37/117.5 |

FOREIGN PATENT DOCUMENTS 7906391 3/1979 France .

OTHER PUBLICATIONS

*Best of Farm Show* '89, "Barn Scrapers Made From Used Industrial Tires", Dec. 1988.

Primary Examiner—David H. Corbin
Assistant Examiner—Arlen L. Olsen
Attorney, Agent, or Firm—Price & Heneveld

[57] ABSTRACT

An offal scraper is provided for motorized farm implements and includes a rigid deck, skirt and resilient scraping element which form a cup shaped scraper for containing and pushing offal. The deck has a semicircular shape including a curved rear edge and a substantially flat upper mounting surface. The skirt drapes downwardly from the curved rear edge and provides a curvilinear mounting surface to which the scraper element is affixed. The scraper element takes the shape of the curved mounting surface and can be moved along a supporting floor surface in a squeegee type fashion. A second scraper element can be affixed to the front edge of the deck providing a second scraping action. Various attachment structures can be affixed to the upper mounting surface on the deck.

10 Claims, 7 Drawing Sheets

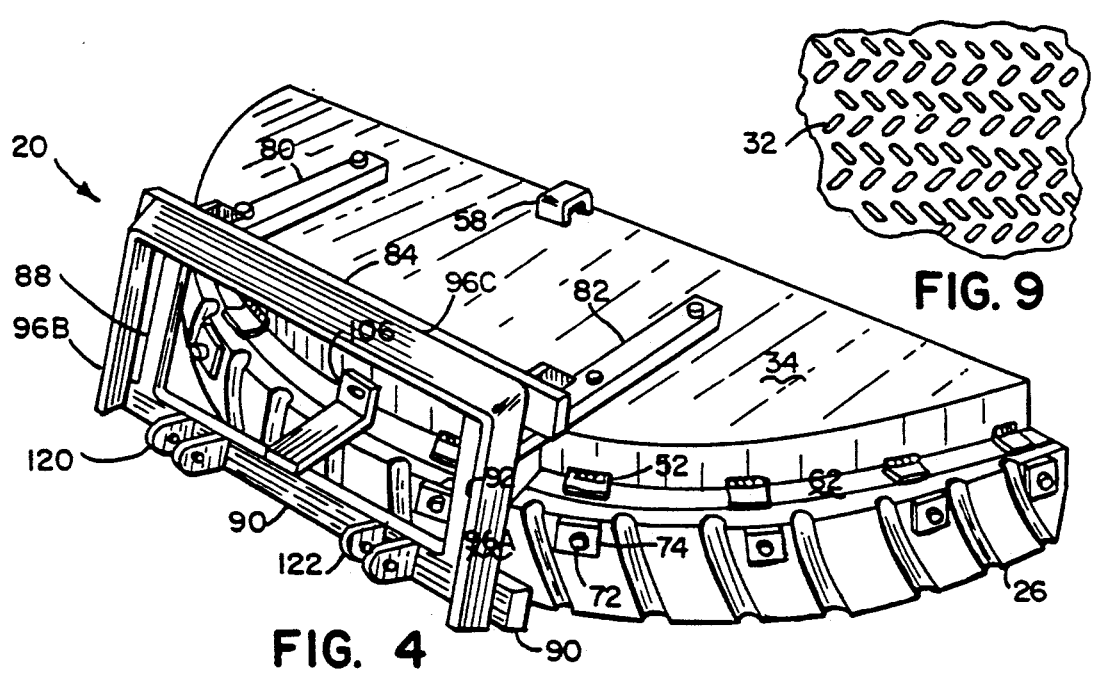
FIG. 4
FIG. 9
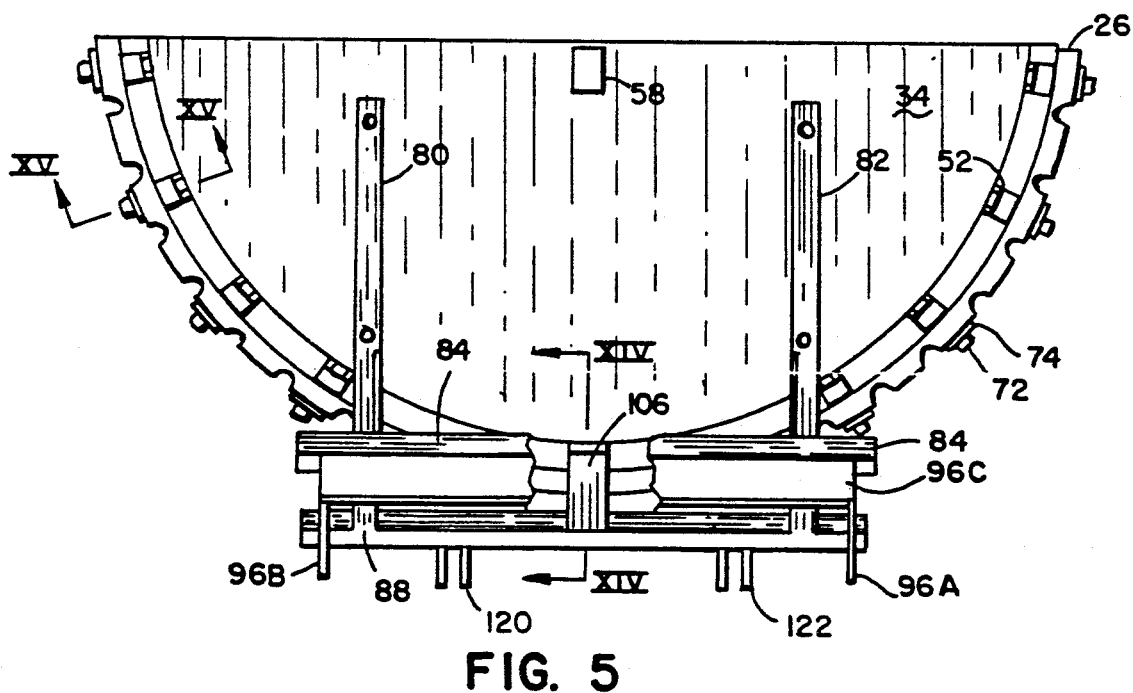
FIG. 5

OFFAL SCRAPER

BACKGROUND OF THE INVENTION

This invention relates to scrapers and in particular to scrapers of the type that are readily attachable to motorized farm implements for moving offal and the like.

Offal, such as animal waste and other debris, accumulates in barns and must be periodically removed. Various removal systems-have been installed in barns, but their high capital cost and lack of versatility are disadvantageous. U.S. Pat. No. 4,819,349 to Mensch discloses an offal scraper that is portable, relatively inexpensive, and is attachable to the front bucket of a front end loader or similar equipment. While this type of scraper has many advantages, it lacks rigidity, such that the scraper sometimes tends to non-uniformly collapse if high downward loads are exerted to increase the squeegee scraping action. Correspondingly, this tendency to collapse restricts the ability to use construction tires which are worn thin or to use tires having a weak wall strength. Further, offal tends to pile up and flow upwardly through the open center section creating a messy maintenance problem. Also, further improvements in cost, ease of manufacture, multiple scraping surfaces, and attachability to motorized farm implements are desired.

SUMMARY OF THE INVENTION

An offal scraper according to the present invention comprises a deck with a scraping element which can be fastened to a motorized farm implement. The deck has a curved rear edge and upper mounting surface with a skirt attached to the curved rear edge and draping downwardly therefrom Attached to the lower edge of the skirt is a resilient scraper element which takes the shape of the skirt and slides along a supporting surface such as a barn floor to provide a squeegee cleaning action. The upper mounting surface of the deck provides a surface to which various mounting structures may be affixed and through which various vertical and horizontal forces may be uniformly transmitted to the scraper element.

Another aspect of the present invention provides a second scraper element affixed to a front linear edge of the deck. The scraper assembly can be rotated such that the second scraper element contacts the supporting surface thus providing a second type of squeegee cleaning action.

The principal objects of the present invention are to provide an offal scraper which provides a more uniform transmission of downward forces to the scraper element for improved cleaning action and offal containment. The scraper also provides a rigid structure allowing for use of thinner tread from badly worn construction tires, as well as improving ease of manufacture.

These and other features, advantages, and objects of the invention will be further understood and appreciated by those skilled in the art by reference to the following specification, claims, and appended drawings.

BRIEF DESCRIPTION OF THE DRAWINGS

FIG. 4 is an rear elevated perspective view of the scraper assembly;

FIG. 5 is a top plan view of the scraper assembly, with a portion thereof broken away;

FIG. 9 is a plan view of a portion of the scraper assembly having a roughened surface;

DESCRIPTION OF THE PREFERRED EMBODIMENT

Figure 1:
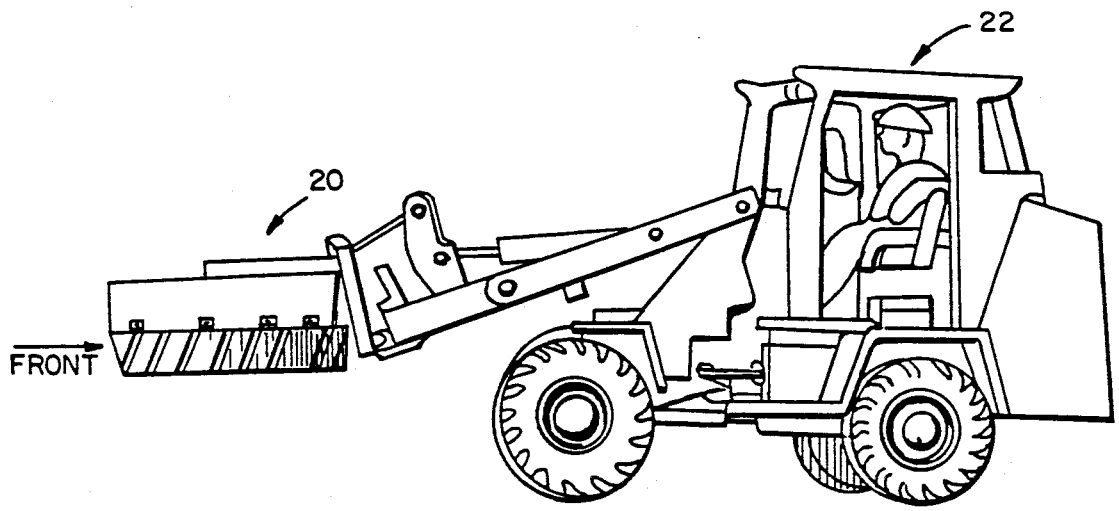
FIG. 1 is a side view of a scraper assembly embodying the present invention, shown attached to a front end loader.
Figure 2:
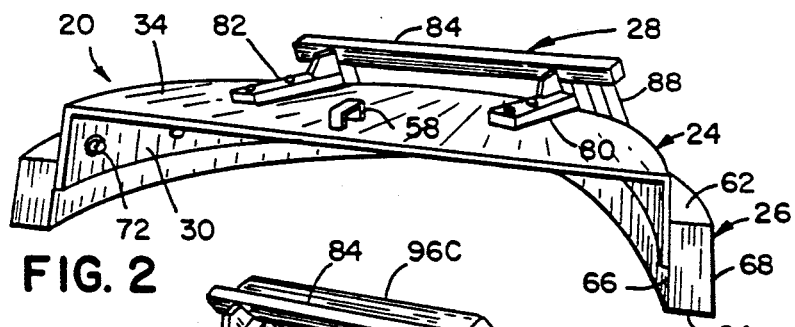
FIG. 2 is a front perspective view of the scraper assembly.
Figure 3:
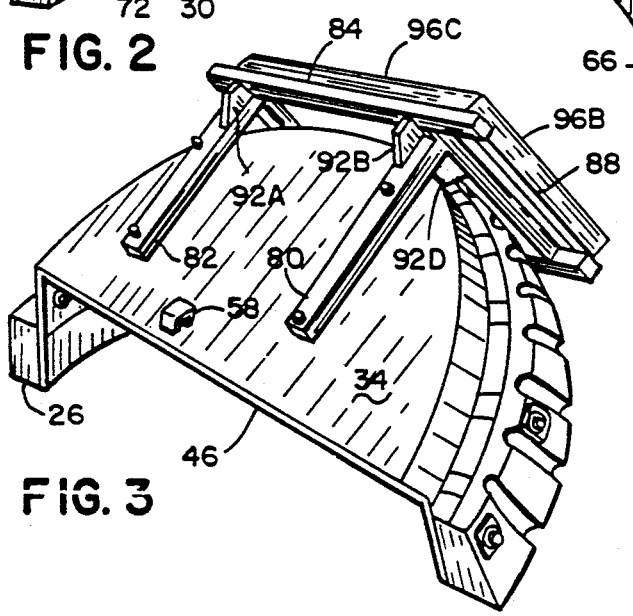
FIG. 3 is an elevated front perspective view of the scrape assembly.
Figure 7:
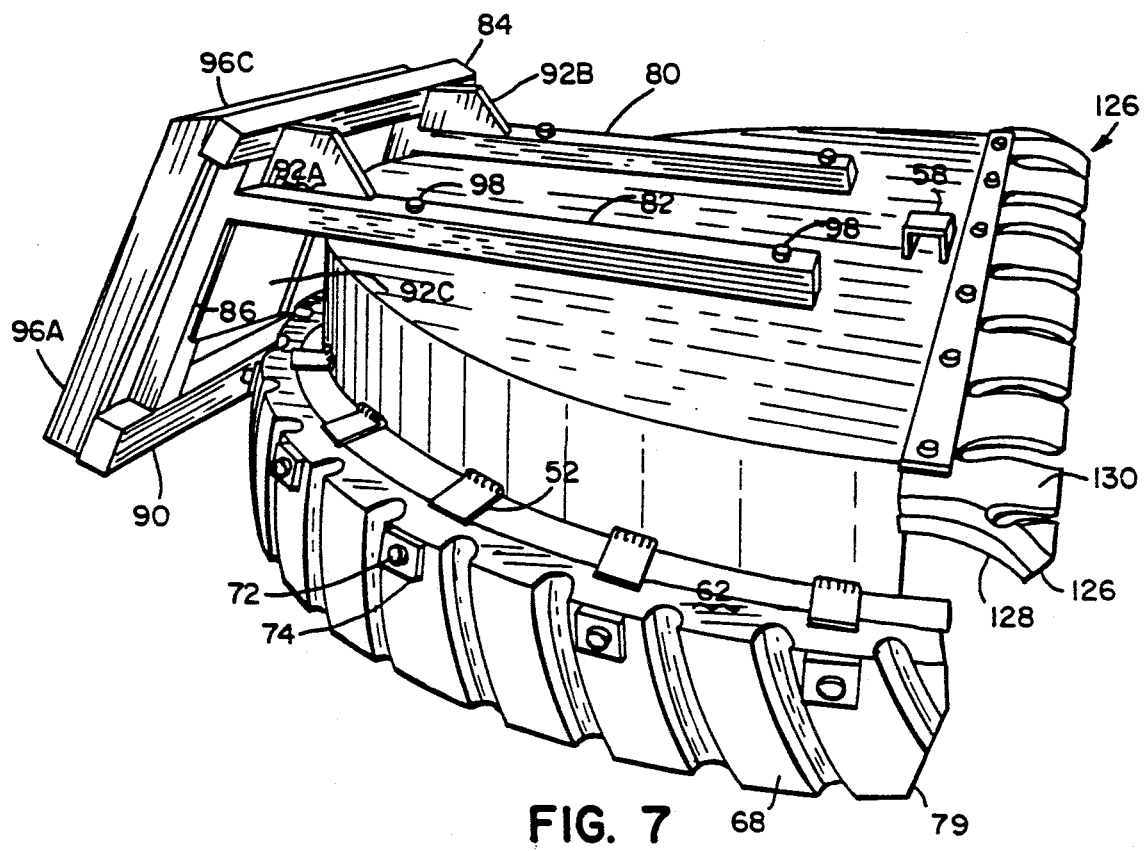
FIG. 7 is a side perspective view of the scraper assembly, shown with a second scraping element attached thereto.

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary It is also to be understood that the specific devices and processes illustrated in the attached drawings, and described in the following specification are simply exemplary embodiments of the inventive concepts defined the appended claims. Hence, specific dimensions and o other physical characteristics relating to the embodiments disclosed herein are not to be considered limiting, unless the claims expressly state otherwise.

Figure 8:
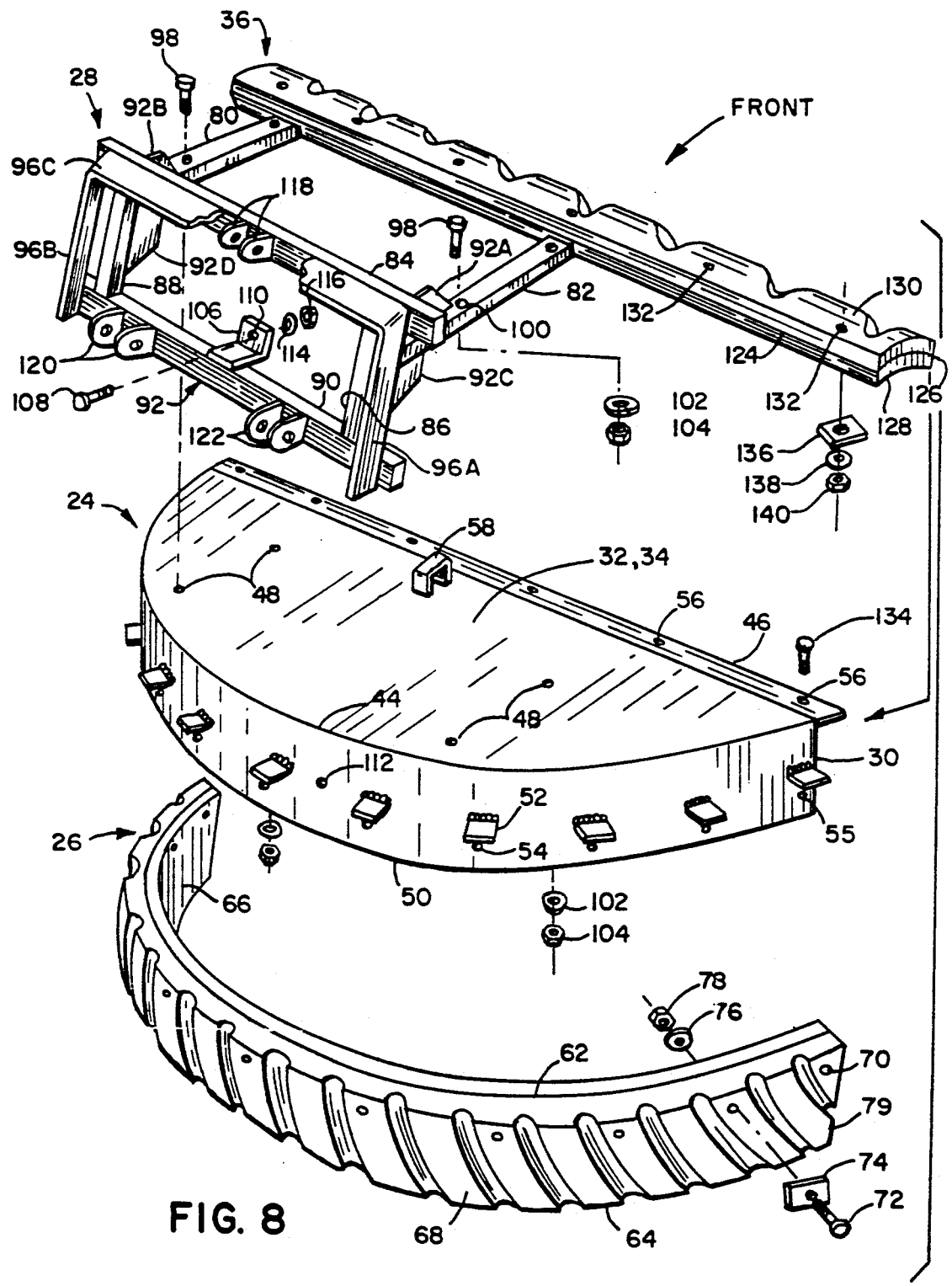
FIG. 8 is an exploded perspective view of the scraper assembly shown in FIG. 7.
Figure 10:
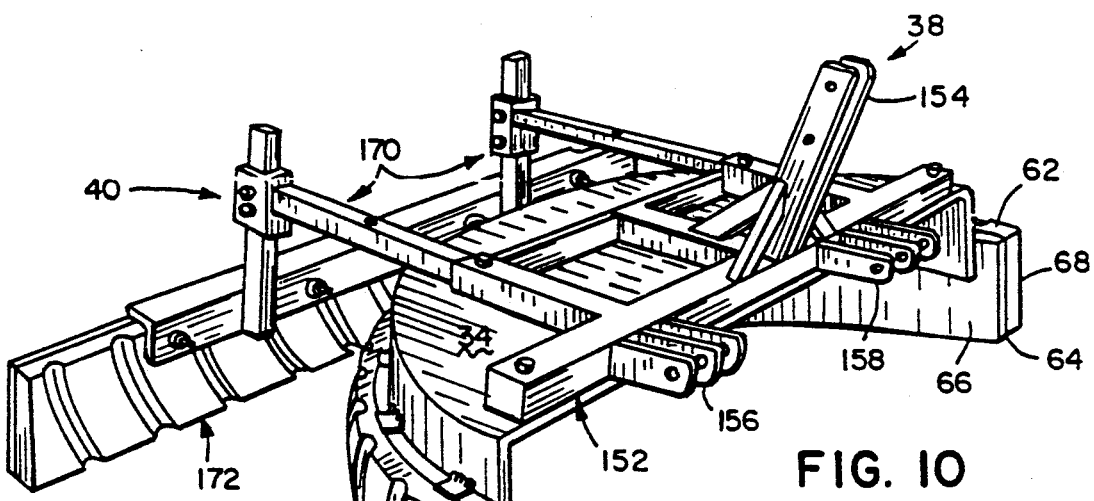
FIG. 10 is a perspective view at the scraper assembly shown with a removable second scraper element, and a three point hitch attachment.
Figure 11:
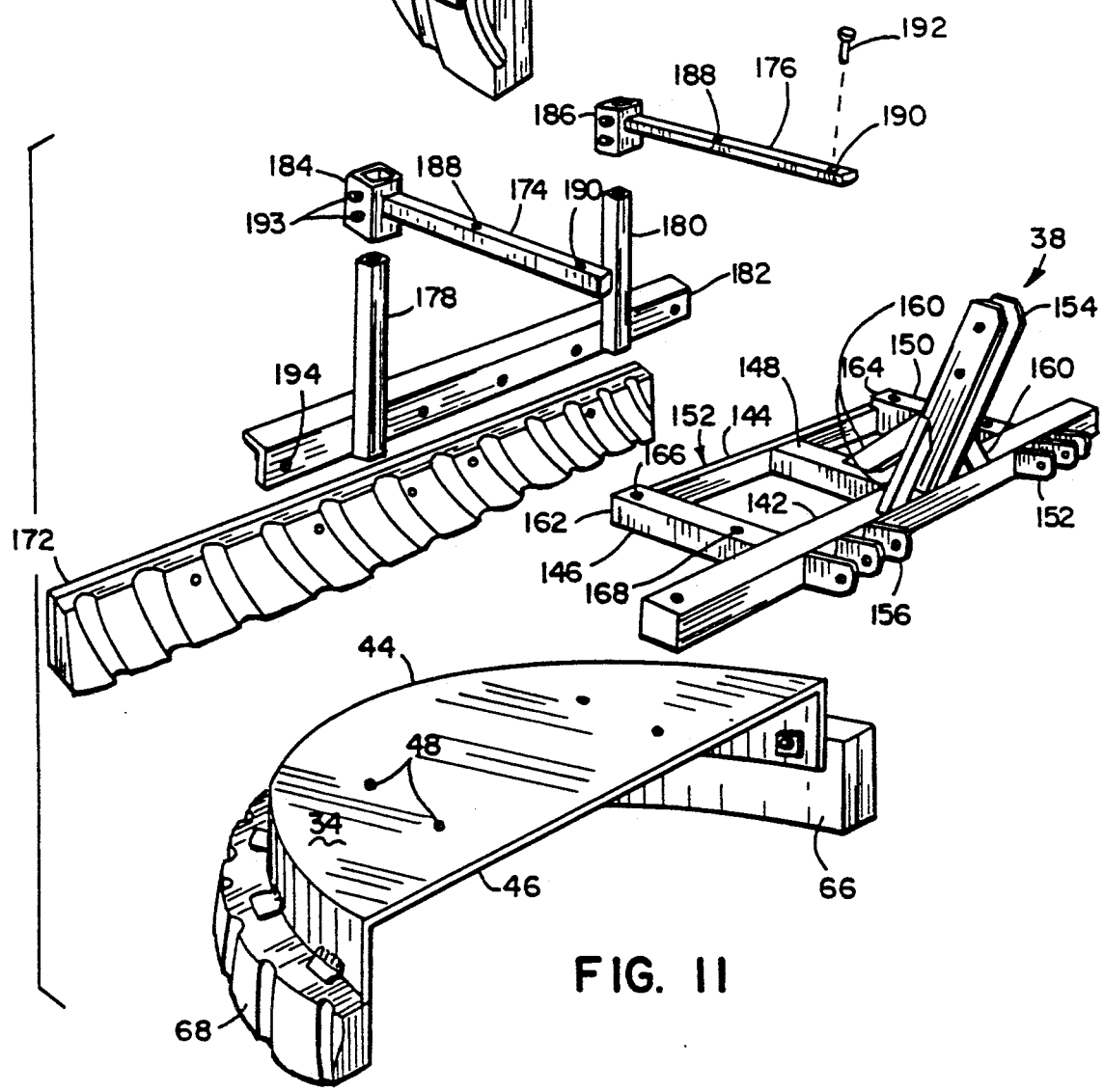
FIG. 11 is a partially exploded perspective view of the scraper assembly shown in FIG. 10.

Referring now specifically to the drawings and the illustrative embodiments depicted therein, FIG. 1 shows an offal scraper assembly 20 mounted to a motorized farm implement 22. Offal scraper assembly 20 comprises a deck 24, (FIGS. 2-9) a scraper element 26, and a carrier assembly 28 interconnected in a manner discussed in detail below. Deck 24 includes a downwardly draping skirt portion 30 to which scraper element 26 is mounted thereby forcing scraper element 26 to take the shape of skirt 30. Deck 24 also includes an upper mounting surface 32 located centrally on deck upper portion 34 to which various carrier assemblies can be mounted. The illustrated carrier assembly 28 adapted for attachment to a front end loader or other motorized farm implement 22. Also shown in FIG. 8 is a second scraper element 36 which can be mounted to the front of offal scraper assembly 20. FIGS. 10-11 show another embodiment having a second carrier assembly 38 which has a second style of three point hitch attachment and a removable third scraper arrangement 40.

Figure 6:
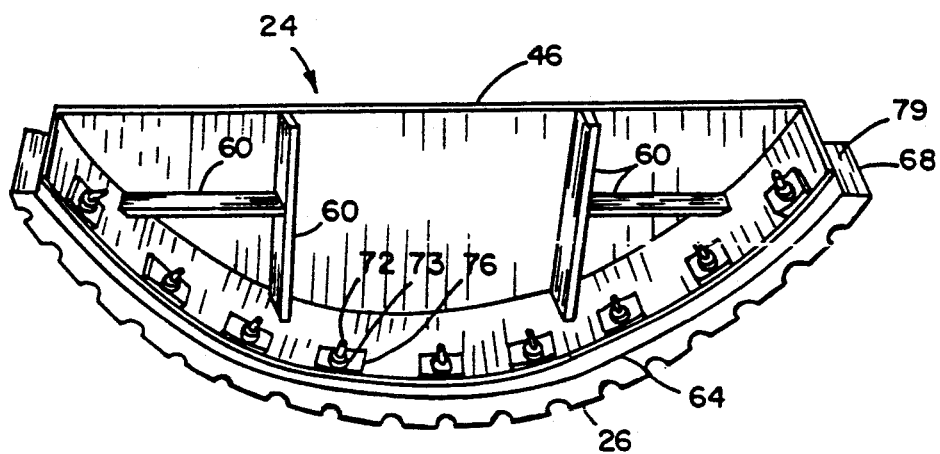
FIG. 6 is a bottom front perspective view of the scrape assembly.

Deck 24 will now be described in detail by referring to the preferred embodiment illustrated in FIG. 2-9. As best shown in FIG. 8, deck 24 has a semicircular upper portion 34 and downwardly draping skirt portion 30 to form a rigid, cup shaped device for containing offal as the offal is pushed forward. Upper portion 34 is defined by a curved rear edge 44 and a straight front edge 46, and includes a generally centrally located upper mounting surface 32 having holes 48. Skirt 30 is fixedly attached to the rear edge 44 of deck 24 by means such as by welding, and depends or drapes downwardly therefrom to skirt lower edge 50. Skirt 30 includes stops 52 which project perpendicularly rearwardly outward from skirt 30 and are generally uniformly spaced horizontally around skirt 30. Stops 52 are located a predetermined distance above the lower edge 50, and there is a hole 54 located a predetermined distance below each stop 52. The forward edge 55 of skirt 30 is angled rearwardly at a sufficient angle to cause scraper assembly 20 to slide upwardly and over obstructions such as curbs or other indentations in a cement barn floor. In some embodiments, the upper portion 34 of deck 24 has a plurality of holes 56 positioned a predetermined distance rearward of straight front edge 46 and uniformly spaced there along for attachment of second scraper element 36. Upper portion 34 can also have convenience handle 58 which is most typically located centrally on upper portion 34 and near front edge 46. It should be noted that upper portion 34 can be made of various materials, but in the preferred embodiment is contemplated to be a metal sheet such as boiler plate, a material commonly known in the art, having a roughened surface for skid-resistance for standing thereon (FIG. 9). Deck 24 is reinforced as needed by welding support webs 60 on the underside of deck 24 such as illustrated in FIG. 6.

Figure 15:
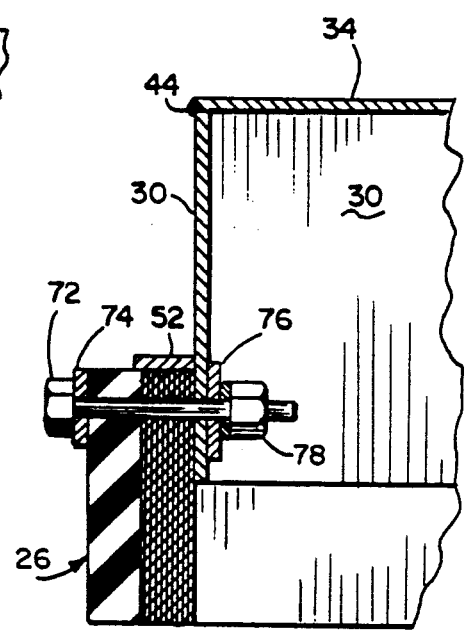
FIG. 15 is a cross-sectional view of the scraper assembly taken through lines XV—XV in FIG. 5.

Scraper element 26 is made of resilient material and will now be described as best shown in FIG. 8. In the preferred embodiment, scraper element 26 is a portion of a tire such as a worn out construction equipment tire. A band of material is obtained by taking two parallel slices through the tread portion of the tire and thus, a band of resilient material is obtained having a substantially uniform width and thickness, and a generally curving shape. The band is cut to length as needed, thus forming scraper element 26 having relatively a flat upper edge 62, a relatively flat lower edge 64, a curving forward edge 66, and a treaded rear edge 68. Located a predetermined distance below upper edge 62 and piercing horizontally through scraper element 26 are holes 70 which are strategically located to mate with holes 54 in skirt 30. It should be noted that lower edge 64 provides a surface sufficiently flat to provide a squeegee type action as it traverses across a supporting surface such as a cement barn floor. In the mounted position (FIG. 15), the scraper element upper edge 62 abuts the underside of skirt stops 52, and the upper part of the scraper element forward edge 66 is placed against the lower rearward part of skirt 30 with bolts 72 passing through flat washers 74, scraper element holes 70, skirt holes 54, and locking washers 76 and nuts 78. Thus, scraper element 26 is forced to take on the shape of deck skirt 30. Scraper element 26 has ends 79 angled rearwardly similar to the forward edge 55 of skirt 30 to cause scraper assembly 20 to ride upwardly and over obstructions such as curbs or other indentions on a barn floor.

Figure 14:
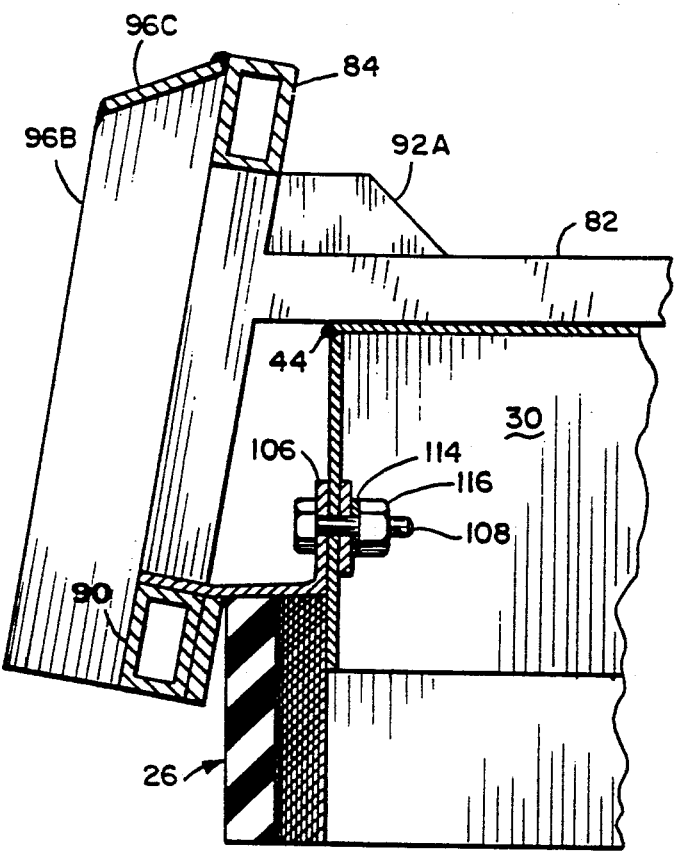
FIG. 14 is a cross-sectional view of the scraper assembly as taken through lines XIV—XIV in FIG. 5.

Carrier assembly 28 will now be described in detail as shown in FIGS. 2–5, 7 and 8. As best shown in FIG. 8, carrier assembly 28 has parallel horizontal channel members 80 and 82 which extend rearward of rear edge 44 of deck 24 and are connected at their rear ends to upper horizontal member 84 and vertical members 86 and 88. Members 84, 86, and 88 connect with lower horizontal member 90 to form a picture frame shaped bracket 92. Bracket 92 hangs downwardly and at an angle slightly forward from vertical. All frame members 80 through 90 are welded together and reinforced by webs 92A, B, C, D and enlarged webs 96A, B, and C. Horizontal channel members 80 and 82 set on and are affixed to the upper mounting surface 32 of deck 24 by methods commonly known in the art, such as welding or as shown in the preferred embodiment by bolts 98 passing through holes 100 in channel members 80 and 82 and mating holes 48 in upper mounting surface 36 of deck 24, bolts 98 being held in place by mating lock washers 102 and nuts 104. Picture frame bracket 92 is anchored in its proper orientation to offal scraper assembly 20 to prevent bending during use by anchoring bracket 106 which is centrally located on lower horizontal member 90 and extends forward, contacting skirt 30 (FIG. 14). Anchoring bracket 106 is welded centrally to lower horizontal member 90 and affixed to skirt 30 by methods commonly known in the art, such as welding, or as shown in the preferred embodiment by a bolt 108 through holes 110 in anchoring bracket 106 and holes 112 in skirt 30, bolt 108 being held in place by washer 114 and nut 116. Located centrally on upper horizontal member 84 is bracketry 118 forming the upper point of a three point hitch which is a system of attachment to motorized implements 22 well known in the art. Bracketry 120 and 122 are located on lower horizontal member 84 at points equidistant from a central point and form the bottom two points of the well known three point hitch attachment shown.

A second scraper element 36 may also be provided on scraper assembly 20. Second scraper element 36 is made of a material similar to first scraper element 26, and can similarly be made of a cut portion of tire such as a construction equipment tire. Element 36 in its installed position has a relatively flat rear edge 124, relatively flat front edge 126, a curving lower edge 128, and a treaded upper edge 130 Holes 132 are located a predetermined distance forward of rear edge 124 and piercing vertically through element 36, and are strategically located to mate with holes 56 near straight front edge 46 of deck 24. The cut portion is cut to length as needed and placed along front edge 46 of deck 24 such that holes 132 in second scraper element 36 are aligned with holes 56 of deck 24; and bolts 134 are inserted through scraper element holes 56, deck holes 132, flat washers 136, lock washers 138, and nuts 140. In this manner, the curved second scraper element 36 is forced to take on a substantially linear shape and provides a second shaped surface for providing a second type of squeegee action.

A second carrier assembly 38 is shown in FIGS. 10–11, and will now be described in detail. A rectangular frame work of welded horizontal channel members 142, 144, 146, 148, and 150 form a framework which will be referred to as framework 152 for convenience. Framework 152 has an upright upper three point hitch member 154 and lower three point hitch members 156 and 158 welded to front channel member 142. Webs or braces 160 are added to give strength to upright upper member 154 and keep it in its proper orientation during use. Framework 152 is affixed to deck 24 in a similar fashion as described for the horizontal channel members 80 and 82 of first carrier assembly 28. Channel members 146 and 150 can have open ends 162 and 164 and holes 166 and 168 if needed for attachment of third scraper arrangement 40 as discussed below.

The removable third scraper arrangement 40 will now be described with reference to FIGS. 10–11. Removable scraper arrangement 40 is comprised of a framework 170 and a third scraper element 172. Framework 170 is in turn comprised of horizontal mounting channels 174 and 176, vertical members 178 and 180, and crossbar 182. Mounting channels 174 and 176 each contain a rearward hub end 184 and 186 which mateably receive and hold vertical members 178 and 180. Mounting channels 174 and 176 further are configured to be slidably inserted into open ends 162 and 164 of members 146 and 150 of carrier assembly 38. Channels 174 and 176 contain holes 188 and 190 which mate with holes 166 and 168 of second carrier assembly 38. Framework 170 can thus be inserted into second carrier assembly 38 and held in place by bolts 192 placed through holes 166, 168, holes 188, 190, and secured by washers and nuts (not shown). Vertical members 178 and 180 are affixed to crossbar 182 by a common method such as welding. Crossbar 182 is further provided with holes 194 spaced linearly and substantially regularly across the length of crossbar 182. Third scraper element 40 is formed similarly to second scraper element 36 and is similarly attached to crossbar 182. Third scraper arrangement 40 provides a squeegee action similar to the second scraper element.

Figure 12:
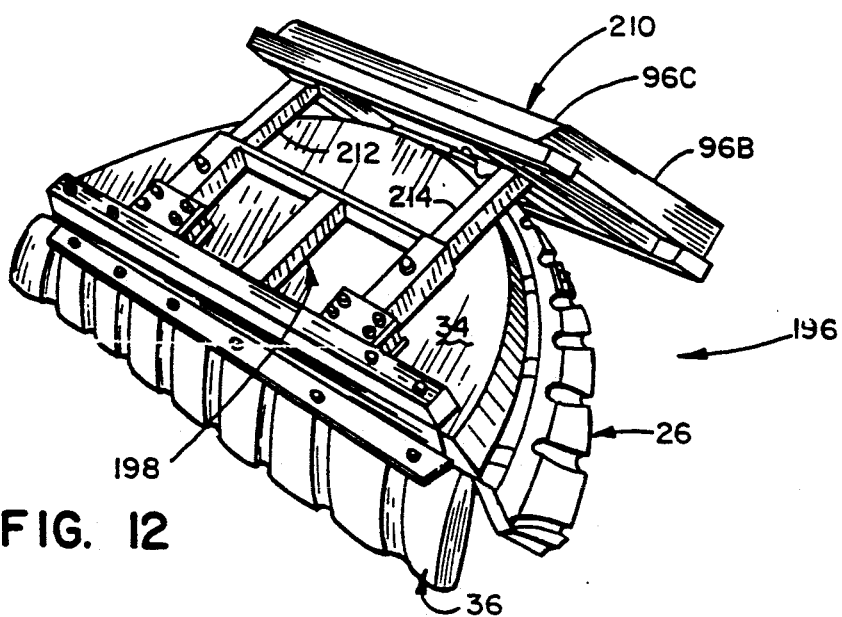
FIG. 12 is a perspective view of the scraper assembly, showing a removable carrier assembly.
Figure 13:
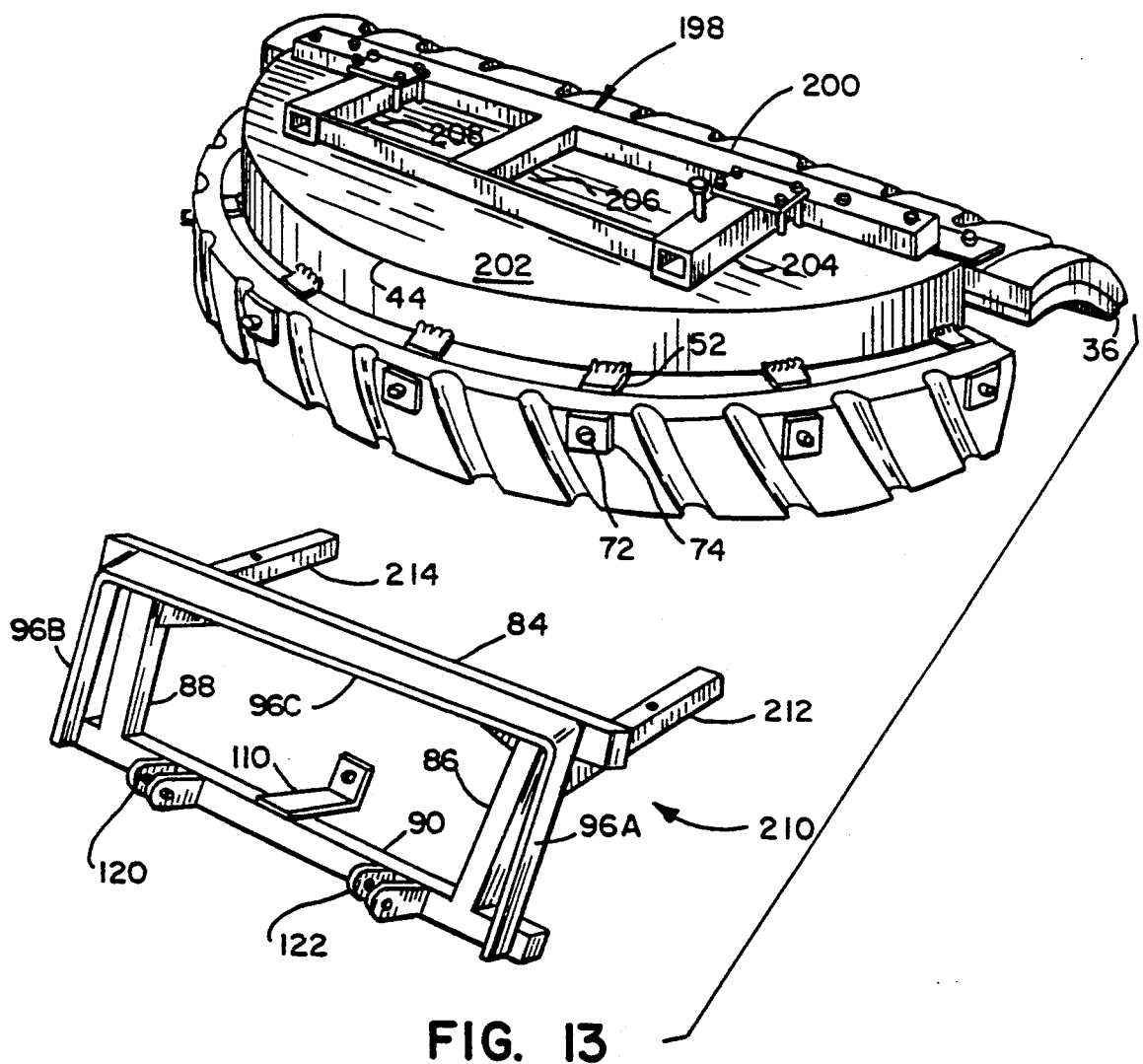
FIG. 13 is a partially exploded rear perspective view of the scraper assembly shown in FIG. 12.

A third carrier assembly 196 will now be described as shown in FIGS. 12–13. Third carrier assembly 196 is similar to first carrier assembly 28 except that it is quickly removable. Third carrier assembly 196 includes a framework 198 and a framework 210. Framework 198 is made of horizontal members 200, 202, 204, 206, and 208, and is formed similar to framework 152 (having horizontal member 142, 144, 146, 148, and 150 respectively). Framework 210 is identical to first carrier assembly 28 with the additional feature that horizontal members 212 and 214 are configured to slideably engage horizontal members 204 and 208. In this manner, a third carrier assembly 196 may be removably installed.

It is important to note that, though only three scraper element arrangements and three carrier assemblies have been shown, a myriad of possible combinations and alternatives exist such as reversible carrier assemblies, rotatable carriage assemblies, and assemblies which allow the longitudinal angle to be changed. For example, the carrier assembly disclosed in U.S. Pat. No. 4,819,349 to Mensch could also be used to attach the scraper to the bucket of a front end loader, without the need to leave the implement.

OPERATION

Having thus described the preferred embodiments of the invention, the operation and use of the above invention should be obvious to one skilled in the art. Initially, first scraper element 26 and first carrier assembly 28 are fully assembly to deck 24. A motorized farm implement 22 then operably attaches to first carrier assembly 28 and thereby allows a user to operably control the position and forces imparted from implement 2 through first carrier assembly 28 and deck 24-to first scraper element 26. When first scraper element 26 is placed flat upon a supporting surface such as a cement barn floor and slideably moved forward, flat lower edge 64 provides a squeegee type action which pushes offal forward. The curved forward edge 66 acts as a dam to contain the offal thus allowing significant amounts to be collected and pushed forward at a time. Skirt 30 acts as a further upper dam along with deck upper portion 34 to contain the offal material and force it forward. Increased downward force can be imparted as necessary for the scraper assembly 20 to adequately perform its function. The forward edges 55 and 79 of skirt 30 and scraper element 26 respectively are inclined to cause scraper assembly 20 to ride up and over most obstructions encountered.

Second scraper element 36 offers a second scraping surface of different shape for scraping offal. The second scraper element 36 is made to contact the supporting surface such as a barn floor by rotating the offal scraper assembly 20 forward until element 38 is properly positioned with front edge 126 touching the supporting surface. The use of second scraper element 36 is similar to the use of first scraper element 26, a squeegee action being created as front edge 126 is dragged across the supporting surface.

Second carrier assembly 38 and third carrier assembly 196 may be utilized much like first carrier assembly 28. Each carrier 38 and 196 can be affixed to upper mounting surface 32 of deck 24 either in a frontward or rearward orientation. Thus, motorized farm implement 22 can operate offal scraper assembly 20 in a manner most convenient to the user. It should be noted that first and third carrier assembly 28 and 196 are designed for attachment to an implement 20 such as a front end loader, while second carrier assembly 38 is designed for a three point hitch attachment as is common with motorized farm implements 20 such as tractors.

Removable third scrape arrangement 40 offers yet another scraping surface. This scraper arrangement is substantially similar to the use of second scraper element 36, but offers removability and also rearward scraper capability without forward rotation of the whole scraper assembly 20.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which as exclusive property or privilege is claimed are defined as follows:

1. An offal scraper adapted for use with motorized implements and the like, comprising:
   a generally semicircular, rigid, metal deck having a curved rear edge and an upper mounting surface;
   a rigid metallic skirt attached to and integrally formed with the curved rear edge of said deck and draping downwardly therefrom, said skirt extending substantially the entire length of said curved rear edge and forming with said deck a rigid cup-shaped device for containing offal as said scraper is moved forwardly;
   a resiliently flexible scraper element adapted to clean a floor surface with a squeegee wiping action, said scraper element being formed from the tread portion of a tire, having substantially parallel upper and lower boundaries and being substantially coextensive in length with said skirt;
   means for attaching said scraper element to said skirt such that said element takes the curved shape of said skirt and extends downwardly therefrom a sufficient distance to contact the surface to be scraped with a squeegee action;

mounting means affixed to the upper mounting surface of said deck, and configured to allow attachment of said scraper to a motorized implement, so that forces applied to said deck by the implement are controllably transmitted to said scraper element for improved cleaning action and offal containment.

2. The offal scraper assembly of claim 1 wherein said mounting means is comprised of:
   a frame fastened to said deck;
   said frame having a second mounting means; and
   said second mounting means having a three point attachment arrangement for attachment to said motorized implement.

3. The offal scraper assembly of claim 2 wherein said second mounting means is slidably removable.

4. The offal scraper assembly of claim 2 including:
   a third scraper element; and
   said frame includes structure that securely holds said third scraper element.

5. The offal scraper assembly of claim 1 wherein:
   said deck has a top surface; and
   said top surface is a skid-resistant rough surface.

6. An offal scraper adapted for use with motorized farm implements and the like, comprising:
   a rigid deck having a front edge, a curved rear edge and an upper mounting surface, said front edge having a second attaching means defining multiple mounting points arranged in a linear pattern and located a predetermined distance rearward of said front edge;
   a rigid skirt attached to the curved rear edge of said deck and draping downwardly therefrom;
   a resiliently flexible scraper element adapted to clean a floor surface with a squeegee wiping action;
   means for attaching said scraper element to said skirt in a depending orientation therefrom;
   mounting means affixed to the upper mounting surface of said deck, and configured to allow attachment of said scraper to a motorized farm implement, whereby forces applied to said deck by the implement are transmitted uniformly to said scraper element for improved cleaning action and offal containment; and
   a second scraper element made of a resilient material and fastened to said second attaching means at said multiple mounting points thereby receiving shape.

7. The offal scraper assembly of claim 6 wherein:
   said second scraper element is made of reinforced rubber.

8. The offal scraper assembly of claim 7 wherein:
   said scraper element is additionally a removed portion of a tire.

9. An offal scraper for use with a motorized implement comprising:
   a rigid metal deck having a downwardly draping structure defining multiple attachment points arranged in a curvilinear pattern, and further having an upper horizontally flat portion, said downwardly draping structure forming with said upper horizontally flat portion a rigid cup-shaped device for containing offal as said scraper is moved forwardly;
   a resilient scraper element resilient fastened to said multiple attachment points whereby said scraper element is given shape, said scraper element being formed from the tread portion of a tire, having substantially parallel upper and lower boundaries and being substantially coextensive in length with said skirt; and
   mounting means fastened to said flat portion of said rigid deck providing attachment for said offal scraper to a motorized implement so that forces applied to said deck by the implement are controllably transmitted to said scraper element for improved cleaning action and offal containment.

10. In a scraper assembly having a generally horizontally opening bucket means defining a rear wall and an upper wall, a scraper element comprised of a portion of vehicle tire, said scraper element having an outwardly forwardly curved scraping wall defined by a portion of a tread section of said tire, said scraping wall having a substantially flat bottom edge, a mounting means for mounting said scraper assembly to a motorized implement including means for transmitting downward forces from said motorized implement to said scraper element to selectively engage a horizontal surface with said bottom edge and to slide said bottom edge over the horizontal surface in a squeegee fashion;
   the improvement in the scraper assembly comprising:
   said bucket means comprised of a rigid deck and rigid skirt;
   said rigid deck having a generally semicircular rigid metal upper portion including a curved rear edge and a continuous planar upper surface;
   said mounting means being mounting structure fastened to said upper surface of said rigid deck;
   said rigid skirt attached to said curved rear edge and draping downwardly therefrom, said skirt extending substantially the entire length of said curved rear edge and forming with said deck a rigid cup-shaped device for containing offal as said scraper assembly is moved forwardly; and
   said scraper element affixed to said rigid skirt and taking shape therefrom.

* * * * *